(12) United States Patent
Nickel et al.

(10) Patent No.: US 6,835,242 B2
(45) Date of Patent: Dec. 28, 2004

(54) CONDITIONING OF ORGANIC PIGMENTS

(75) Inventors: Uwe Nickel, Bad Homburg (DE); Klaus Kund, Langenscheid (DE); Erwin Dietz, Königstein (DE); Joachim Weber, Frankfurt am Main (DE); Olaf Schupp, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/403,328

(22) Filed: Mar. 31, 2003

(65) Prior Publication Data

US 2003/0164118 A1 Sep. 4, 2003

Related U.S. Application Data

(62) Division of application No. 09/892,588, filed on Jun. 27, 2001, now Pat. No. 6,562,121.

(30) Foreign Application Priority Data

Jun. 28, 2000 (DE) ......................................... 100 31 558

(51) Int. Cl.$^7$ ............................ C08K 5/00; C09B 67/00
(52) U.S. Cl. ...................... 106/493; 106/31.6; 106/412; 106/494; 106/495; 106/496; 106/497; 106/498; 241/5; 241/15; 241/24.1; 430/7; 430/137.1
(58) Field of Search ............................... 106/31.6, 412, 106/493, 494, 495, 496, 497, 498; 241/5, 15, 24.1; 430/7, 137.1

(56) References Cited

U.S. PATENT DOCUMENTS

| | | | |
|---|---|---|---|
| 4,906,735 A | 3/1990 | Hunger ....................... 534/575 |
| 5,110,931 A | 5/1992 | Dietz et al. .................... 546/37 |
| 5,492,564 A | 2/1996 | Wooden et al. .............. 106/493 |
| 5,534,328 A | 7/1996 | Ashmead et al. ........... 428/166 |
| 5,591,258 A | 1/1997 | Urban et al. ................. 106/497 |
| 5,755,874 A | 5/1998 | Urban et al. ................. 106/497 |
| 5,811,062 A | 9/1998 | Wegeng et al. .............. 433/129 |
| 5,843,220 A * | 12/1998 | Babler ........................ 106/415 |
| 5,900,050 A * | 5/1999 | Hayden et al. .............. 106/493 |
| 5,910,577 A | 6/1999 | Metz et al. ................... 534/742 |
| 5,922,123 A * | 7/1999 | Sandefur et al. ............. 106/493 |
| 6,013,126 A * | 1/2000 | Shannon et al. ............. 106/493 |
| 6,410,619 B2 * | 6/2002 | Greene et al. ................. 524/88 |
| 6,562,121 B2 * | 5/2003 | Nickel et al. ................ 106/493 |
| 2002/0010331 A1 | 1/2002 | Nickel et al. ................ 544/212 |
| 2002/0014179 A1 | 2/2002 | Nickel et al. ............. 106/31.28 |

FOREIGN PATENT DOCUMENTS

| | | |
|---|---|---|
| DE | 1 261 106 | 2/1968 |
| DE | 39 26 466 | 2/1991 |
| EP | 0 077 025 | 4/1983 |
| EP | 0 318 022 | 5/1989 |
| EP | 0 655 485 | 5/1995 |
| EP | 0 672 729 | 9/1995 |
| EP | 0 799 863 | 10/1997 |
| EP | 0 894 831 | 2/1999 |
| EP | 1 162 240 | 12/2001 |
| EP | 1 167 461 | 1/2002 |

OTHER PUBLICATIONS

English abstract for DE 1261106, Feb. 15, 1968.
English abstract for DE 3926466, Feb. 14, 1991.

* cited by examiner

*Primary Examiner*—Anthony J. Green
(74) *Attorney, Agent, or Firm*—Anthony A. Bisulca

(57) ABSTRACT

Organic pigments are conditioned by introducing a liquid prepigment suspension into a miniaturized continuous reactor and thermally treating therein.

2 Claims, 1 Drawing Sheet

CONDITIONING OF ORGANIC PIGMENTS

CROSS REFERENCE TO RELATED APPLICATION

This application is a divisional application of U.S. application Ser. No. 09/892,588, filed Jun. 27, 2001, now U.S. Pat. No. 6,562,121 the contents of which are incorporated herein by reference.

BACKGROUND OF THE INVENTION

The present invention describes a process for conditioning organic pigments in microreactors.

Organic pigments are well known and widely used for pigmenting macromolecular organic materials such as paints, plastics or printing inks. As-synthesized, they are usually either very fine prepigments or coarse crude pigments, which do not meet industrial requirements. Finely divided prepigments frequently have to be subjected to a thermal treatment to obtain the required properties. Coarsely divided crude pigments are frequently subjected to comminution, which usually has to be followed by thermal treatment in order that pigments meeting the industrial requirements may be obtained.

The thermal treatment may produce various desired effects, for example narrow the particle size distribution; shift the average particle size to higher values; deagglomerate as-ground comminuted and strongly agglomerated pigments; add auxiliaries and distribute them homogeneously over the pigment surface; and effect a change between various crystal forms in some cases. These effects then lead to the desired industrial requirements, for example the desired hue, increased color strength or cleanness of hue, improved dispersibility, rheology, lightfastness, gloss or weatherfastness, or control over light scattering properties and hence over the hiding power.

Literature discloses thermal treatment processes for a wide variety of organic pigments:

DE-A-12 61 106 discloses a batch process for thermal treatment of substituted quinacridone pigments by heating the crude pigments in solvents under pressure.

EP-A-0 318 022 discloses a batch process for producing a hiding dimethylperylimide pigment where the hiding power is provided by thermal treatment.

EP-A-0 672 729 discloses a batch process for producing a hiding diketopyrrolopyrrole pigment where the hiding power is provided by thermal treatment.

EP-A-0 655 485 and EP-A-0 799 863 disclose batch processes for producing quinacridone pigments where the transformation from the alpha-phase to the beta-phase is effected by thermal treatment with an organic solvent and in the presence of aqueous alkali.

Batch processes are known for producing an azo pigment where a thermal treatment is carried out in an aqueous medium (EP-7A-0 077 025) or in organic solvents (EP-A-0 894 831).

A feature common to these batch processes is the need to control the process parameters. For example, temperature and duration of the thermal treatment, suspension concentration, use of solvents or presence of acids or bases are decisive for the color properties of the pigments obtained and their quality constancy. Moreover, the scaleup of new products from the laboratory scale to the large industrial scale is inconvenient with batch processes and can present problems, since for example vessel and stirrer geometries or heat transfers have a substantial effect on particle size, particle size distribution and color properties.

It is an object of the present invention to provide an environmentally friendly, economical and technically reliable process for preparing organic pigments by thermal treatment that provides very constant adherence to the desired process parameters and simplifies scaleup.

It is known to carry out certain chemical reactions in microreactors. Microreactors are constructed from stacks of grooved plates and are described in DE 39 26 466 C2 and U.S. Pat. No. 5,534,328. It is pointed out in U.S. Pat. No. 5,811,062 that microchannel reactors are preferably used for reactions that do not require or produce materials or solids that would clog the microchannels.

SUMMARY OF THE INVENTION

It has now been found, that, surprisingly, microreactors are useful for conditioning organic pigments by thermal treatment of their prepigment suspensions.

As used herein, the term "microreactor" is representative of miniaturized, preferably continuous, reactors which are known under the terms of microreactor, minireactor, micromixer or minimixer and which differ by reason of the dimensions and construction of the channel structures. It is possible to use, for example, microreactors as known from the cited references or from publications of the Institut für Mikrotechnik Mainz GmbH, Germany, or of the Fraunhofer Institut für Chemische Technologie, Pfinztal, or else commercially available microreactors, for example Selecto™ (based on Cytos™) from Cellular Process Chemistry GmbH, Frankfurt/Main.

The invention accordingly provides a process for conditioning organic pigments, which comprises thermally treating a liquid prepigment suspension in a microreactor.

Advantageously, the prepigment suspension is fed to the microreactor continuously. The conventional sequence of adding prepigment suspension, water, organic solvents, acids and/or bases can be realized; similarly, the auxiliaries used in conventional processes may likewise be used in the process of the invention.

Useful organic pigments include, for example perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, thiazineindigo, isoindoline, isoindolinone, pyranthrone or isoviolanthrone pigments or mixtures thereof.

DESCRIPTION OF THE PREFERRED EMBODIMENTS

Figure 1:
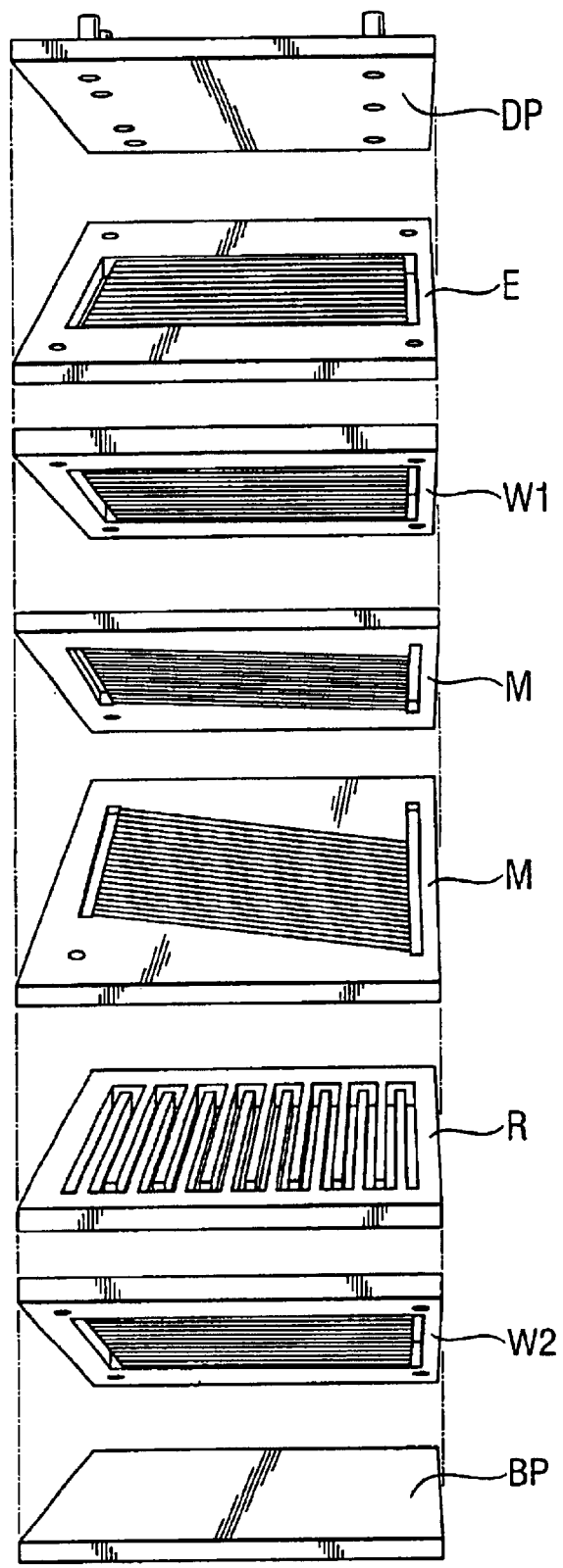
FIG. 1 is an exploded view of a microreactor useful for the preparation of organic pigments by thermal treatment, according to the present invention.

Preferred organic pigments for the purposes of the present invention include for example C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11

783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (C.I. No. 11 777), C.I. Pigment Yellow 74 (C.I. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (C.I. No. 12 514), C.I. Pigment Red 185 (C.I. No. 12 516), C.I. Pigment Red 247 (C.I. No. 15 915).

It is also possible to use more than one organic pigment or solid solutions of organic pigments or combinations of organic with inorganic pigments.

The liquid phase of the prepigment suspension can consist of water, organic solvents, acids, bases or of a mixture of individual or all of these substances.

Useful organic solvents include for example alcohols of 1 to 10 carbon atoms, such as methanol, ethanol, n-propanol, isopropanol, n-butanol, sec-butanol, tert-butanol, n-pentanol, 2-methyl-2-butanol, 2-methyl-2-pentanol, 3-methyl-3-pentanol, 2-methyl-2-hexanol, 3-ethyl-3-pentanol, 2,4,4-trimethyl-2-pentanol, cyclohexanol; or glycols, such as ethylene glycol, diethylene glycol or glycerol; ethers, such as tetrahydrofuran, dimethoxyethane or dioxane; glycol ethers, such as monomethyl or monoethyl ethers of ethylene glycol or propylene glycol, diethylene glycol monomethyl ether, diethylene glycol monoethyl ether, butylglycol or methoxybutanol; ketones, such as acetone, diethyl ketone, methyl isobutyl ketone, methyl ethyl ketone or cyclohexanone; aliphatic amides, such as formamide, dimethylformamide or N,N-dimethylacetamide; urea derivatives, such as tetramethylurea; or cyclic carboxamides, such as N-methylpyrrolidone, valerolactam or caprolactam; $C_1$–$C_4$-alkyl carboxylates, such as butyl formate, ethyl acetate or propyl propionate; or $C_1$–$C_4$-glycol esters of carboxylic acids; or $C_1$–$C_4$-alkyl phthalates or benzoates, such as ethyl benzoate; nitriles, such as acetonitrile or benzonitrile; aliphatic or aromatic hydrocarbons, such as cyclohexane or benzene; or alkyl-, alkoxy-, nitro- or halogen-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also dimethyl sulfoxide and sulfolane. The solvents mentioned may also be used as mixtures.

Preferred organic solvents are alcohols of 1 to 6 carbon atoms, especially ethanol, propanols, butanols, pentanols; aliphatic carboxamides, especially dimethylformamide or N,N-dimethylacetamide; cyclic carboxamides, especially N-methylpyrrolidone; aromatic hydrocarbons, especially toluene, xylenes or ethylbenzene; chlorinated aromatic hydrocarbons, especially chlorobenzene, o-dichlorobenzene; and dimethyl sulfoxide.

It is advantageous to use 3 to 40, preferably 4 to 20, especially 5 to 15, parts by weight of the liquid medium (water, solvent, acid, base) of the prepigment suspension per 1 part by weight of prepigment.

Useful acids include for example inorganic acids, for example hydrochloric acid, phosphoric acid and preferably sulfuric acid; or aliphatic and aromatic carboxylic or sulfonic acids, such as formic acid, acetic acid, propionic acid, butyric acid, hexanoic acid, oxalic acid, benzoic acid, phenylacetic acid, benzenesulfonic acid or p-toluenesulfonic acid, preferably acetic acid and formic acid; or mixtures of acids.

Useful bases includes, for example, inorganic bases such as, for example, sodium hydroxide, potassium hydroxide, sodium carbonate, potassium carbonate and calcium hydroxide, preferably sodium hydroxide; or mixtures of bases; or bases such as, for example, trimethylamine, triethylamine or ammonia; or salts of organic acids such as, for example, sodium acetate or sodium formate.

The conditioning according to the invention may be preceding, accompanied or followed by the addition to the (pre)pigment suspension of one or more auxiliaries selected from the group consisting of pigment dispersants, surfactants, fillers, standardizers, resins, defoamers, dustproofers, extenders, shading colorants, preservatives, drying retarders and rheology control additives.

Useful pigment dispersants include the literature-known derivatives of organic pigments which contain imidazole, pyrazole, phthalimide, sulfonamide, aminomethylene, cyclic carboxamide or saccharin groups or sulfonic acid or carboxylic acid groups or salts thereof.

Useful surfactants include anionic, cationic or nonionic substances or mixtures thereof.

Useful anionic substances include for example fatty acid taurides, fatty acid N-methyltaurides, fatty acid isethionates, alkylphenylsulfonates, alkylnaphthalene-sulfonates, alkylphenol polyglycol ether sulfates, fatty alcohol polyglycol ether sulfates, fatty acid amidepolyglycol ether sulfates, alkyl sulfosuccinamates, alkenylsuccinic monoesters, fatty alcohol polyglycol ether sulfosuccinates, alkane-sulfonates, fatty acid glutamates, alkyl sulfosuccinates, fatty acid sarcosides; fatty acids, for example palmitic, stearic and oleic acid; soaps, for example alkali metal salts of fatty resins, naphthenic acids and resin acids, for example abietic acid, alkali-soluble resins, for example rosin-modified maleate resins and condensation products based on cyanuric chloride, taurine, N,N'-diethylamino-propylamine and p-phenylenediamine. Particular preference is given to resin soaps, i.e. alkali metal salts of resin acids.

Useful cationic substances include for example quaternary ammonium salts, fatty amine alkoxylates, alkoxylated polyamines, fatty amine polyglycol ethers, fatty amines, di- and polyamines derived from fatty amines and fatty alcohols and alkoxylates derived from these di- and polyamines, imidazolines derived from fatty acids and salts of these cationic substances.

Useful nonionic substances include for example amine oxides, fatty alcohol polyglycol ethers, fatty acid polyglycol esters, betaines, such as fatty acid amide N-propylbetaines, phosphoric esters of fatty alcohols or fatty alcohol polyglycol ethers, fatty acid amide ethoxylates, fatty alcohol-alkylene oxide adducts and alkylphenol polyglycol ethers.

The total amount of auxiliaries added may be in the range from 0 to 40% by weight, preferably from 0.5 to 20% by weight, particularly preferably from 1 to 15% by weight, based on (pre)pigment.

In what follows, prepigment, water, solvent, acid, base and auxiliary are collectively referred to as feedstocks.

To carry out the conditioning according to the invention, the feedstocks are introduced into a microreactor individually or as mixtures. In principle all conceivable combinations of the feedstocks are possible, provided the streams are industrially handleable.

The preparation of mixtures of feedstocks to form streams may also be carried out in advance in micromixers or upstream mixing zones. It is also possible for feedstocks to be metered into downstream mixing zones or into downstream micromixers or -reactors.

The thermal treatment is carried out at pressures between atmospheric pressure and 100 bar, preferably between atmospheric pressure and 25 bar. The temperature can vary within wide limits, preferably between 20 and 300° C., especially between 50 and 250° C., in particular between 60 and 200° C.

The thermal treatment according to the invention can also take place immediately following a microreactor synthesis of an organic pigment, in a downstream reactor.

The pigment suspensions prepared by the process of the invention are worked up according to known processes to isolate the pigment. Solvents may be recycled.

A microreactor is constructed from a plurality of laminae which are stacked and bonded together and whose surfaces bear micromechanically created structures which interact to form spaces for chemical reactions. The system contains at least one continuous channel connected to the inlet and the outlet.

The flow rates of the streams are limited by the apparatus, for example by the pressures which result depending on the geometry of the microreactor. It is desirable for the thermal treatment to take place completely in the microreactor, but it is also possible to adjoin a delay zone to create a delay time that may be required.

The flow rates are advantageously between 0.05 ml/min and 5 l/min, preferably between 0.05 ml/min and 500 ml/min, particularly preferably between 0.05 ml/min and 250 ml/min, especially between 0.1 ml/min and 100 ml/min.

A microreactor useful for the preparation of organic pigments by thermal treatment is described in FIG. 1 by way of example.

The present microreaction system is in this case constructed from six microstructured metal laminae, stacked and bonded together, plus a lid plate (DP) and a base plate (BP) to form a processing module that is firmly held bonded together to compress sealing sheets between the plates.

The present microreaction system includes two heat exchangers for cooling and/or heating medium, a mixing zone for any necessary mixing of the feedstocks and a short delay zone.

The heat exchanger (W1) preheats the streams flowing separately into the plate (E). The streams or feedstocks are then mixed within plates (M), which form a conjoint space. The delay zone (R) brings the prepigment suspension to the desired reaction temperature with the aid of the heat exchanger (W2), so that the thermal treatment can take place.

A microreaction system is preferably operated continuously, and the quantities of materials present in the microreactor are in the microliter ($\mu$l) to milliliter (ml) range.

The dimensions of the microstructured regions within the reactor are decisive for the thermal treatment of organic pigments. These dimensions have to be sufficiently large that, in particular, solid particles can pass through without problem and so not clog up the channels. The smallest clear width of the microstructures should be about ten times larger than the diameter of the largest particles. Furthermore, it has to be ensured, by appropriate geometric styling, that there are no dead water zones, for example dead ends or sharp corners, where for example particles could sediment. Preference is therefore given to continuous paths having round corners. The structures have to be sufficiently small to exploit the intrinsic advantages of microreaction technology, namely excellent heat control, laminar flow, diffuse mixing and low internal volume.

The clear width of the suspension-ducting channels is advantageously 5 to 10 000 $\mu$m, preferably 5 to 3 000 $\mu$m, particularly preferably 10 to 800 $\mu$m, especially 20 to 700 $\mu$m.

The clear width of the heat exchanger channels depends primarily on the clear width of the suspension-ducting channels and is advantageously not more than 10 000 $\mu$m, preferably not more than 3 000 $\mu$m, especially not more than 800 $\mu$m. The lower limit of the clear width of the heat exchanger channels is uncritical and is at most constrained by the pressure increase of the heat exchanger fluid to be pumped and by the necessity for optimum heat supply or removal.

The dimensions of a preferred microreaction system depicted in FIG. 1 by way of example are:

| Heat exchanger structures: | channel width | ~600 $\mu$m |
|---|---|---|
| | channel height | ~250 $\mu$m |
| Mixer: | channel width | ~600 $\mu$m |
| | channel height | ~500 $\mu$m |

In the microreactor type described by way of example, the six superposed and closely conjoined metal laminae are preferably supplied with all heat exchanger fluids and feedstocks from above. The pigment suspension and the heat exchanger fluids are preferably removed upwardly. The possible supply of further feedstocks (e.g. water, solvent, acids or bases) involved in the thermal treatment may also be realized via a T-junction located directly upstream or downstream of the reactor. The requisite concentrations and flows are preferably controlled via precision piston pumps and a computer-controlled control system. The temperature is monitored by integrated sensors and controlled with the aid of the control system and of a thermostat/cryostat.

The system depicted here is made of stainless steel; other materials, for example glass, ceramic, silicon, plastics or other metals, may also be used. It is surprising and was unforeseeable that the conditioning of organic pigments by thermal treatment is possible in this technically simple and reliable manner, since it was hitherto assumed that the production of a solid material in the microreactor would lead to the system being clogged up.

Organic pigments prepared according to the invention are useful for pigmenting macromolecular natural or synthetic organic materials, for example cellulose ethers and esters, such as ethylcellulose, nitrocellulose, cellulose acetate, cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, gum, casein, silicone and silicon resins, individually or mixed.

It is immaterial in this connection whether the macromolecular organic compounds mentioned are present as plastically deformable masses, melts or in the form of spinning solutions, paints, coatings or printing inks. Depending on the intended use, it is comparatively advantageous to use the pigments obtained according to the invention as blends or in the form of preparations or dispersions. Based on the macromolecular organic material to be pigmented, the pigments prepared according to the invention are used in an amount of preferably 0.05 to 30% by weight, preferably 0.1 to 15% by weight.

The pigments prepared according to the process of the invention can be used to pigment the industrially common baking finishes from the class of the alkyd-melamine resin coatings, acrylic-melamine resin coatings, polyester coatings, high solids acrylic resin coatings, aqueous coatings based on polyurethane and also two-component coatings based on polyisocyanate-crosslinkable acrylic resins and especially automotive metallic coatings.

The pigments conditioned according to the invention are also useful as colorants in electrophotographic toners and developers, for example one- or two-component powder toners (also known as one- or two-component developers), magnetic toners, liquid toners, polymerization toners and also specialty toners. Typical toner binders are addition polymerization, polyaddition and polycondensation resins, such as styrene, styrene-acrylate, styrene-butadiene, acrylate, polyester, phenol-epoxide resins, polysulfones, polyurethanes, individually or in combination, and also polyethylene and polypropylene, which may each include further ingredients, such as charge control agents, waxes or flow assistants, or as subsequently modified with these additives.

The pigments conditioned according to the invention are further useful as colorants in powders and powder coatings, especially in triboelectrically or electrokinetically sprayable powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) include for example acid anhydrides, imidazoles and also dicyandiamide and derivatives thereof, capped isocyanates, bisacylurethanes, phenolic and melamine resins, triglycidyl isocyanurates, oxazolines and dicarboxylic acids.

The pigments conditioned according to the invention are also useful as colorants in inkjet inks having an aqueous or a nonaqueous basis and also in inkjet inks which operate according to the hot-melt process.

The pigments conditioned according to the invention are also useful as colorants for color filters and also for additive as well as subtractive color generation.

EXAMPLES

To evaluate the coating properties of the pigments conditioned according to the invention, a selection was made, from among the multiplicity of known varnishes, of an alkyd-melamine (AM) resin varnish containing aromatic components and based on a medium-oil alkyd resin and on a butanol-etherified melamine resin, a high-solids acrylic resin baking varnish based on a nonaqueous dispersion (HS) and an aqueous polyurethane-based aqueous varnish (PUR). The color strength and hue were determined in accordance with DIN 55986. Millbase rheology after dispersion was rated on the following five-point scale:

5 thin
4 fluid
3 thick
2 slightly set
1 set

Following dilution of the millbase to the final pigment concentration, the viscosity was assessed using a Rossmann viscospatula type 301 from Erichsen.

Gloss measurements were carried out on cast films at an angle of 20° in accordance with DIN 67530 (ASTMD 523) using a "multigloss" gloss meter from Byk-Mallinckrodt.

The crystal phase of the pigments was determined by X-ray spectroscopy. The X-ray spectra were recorded using Cu Kα radiation. The X-ray diffraction spectra are reported in digital form. The relative intensities were 51–100% for strong lines, 11–50% for medium lines and 2–10% for weak lines.

In the examples which follow, parts and percentages are by weight.

Example 1

0.1 mol of dimethyl aminoterephthalate hydrochloride is diazotized with sodium nitrite at 0 to 10° C. The clarified diazonium salt solution is added dropwise at room temperature over 1 hour to an acetate-buffered suspension of 0.1 mol of N-acetoacetyl-6-methoxy-7-aminoquinoxaline-2,3-dione in the presence of surfactant, for example ®Lutensol AT 25. As soon as the coupling has ended, the batch is heated to 96° C. and filtered and the filter residue is washed salt-free. The moist press cake is dried at 80° C. to obtain C.I. Pigment Yellow 213 prepigment.

150 parts of C.I. Pigment Yellow 213 prepigment are suspended in 1 850 parts of N-methylpyrrolidone and the suspension is pumped via a calibrated piston pump into the microreactor inlet at a flow rate of 6 ml/min. In the microreactor the suspension is heated to 180° C. The reaction suspension emerging from the reactor is filtered and the press cake is washed with N-methylpyrrolidone and dried under reduced pressure.

The prepigment is present in the alpha-phase, characterized particularly by strong lines at 2theta 3.2, 7.9 and 8.8; and by a medium broad line at 26.6. A crystal phase change takes place during the conditioning in the microreactor; the pigment isolated following the conditioning is in the beta-phase: the three lines characteristic for the alpha-phase are no longer there; instead there is a new strong line at 2theta 9.2; the line at 26.6 becomes the strongest line in the diagram.

The particle sizes of the prepigments are substantially less than 70 nm. The conditioned pigment has a particle size distribution with an average particle size diameter of 221 nm.

The prepigment has a reddish-yellow hue, while the conditioned pigment has a greenish-yellow hue.

Example 2

The pigment is prepared as in example 1, except that the conditioning takes place at 130° C. instead of at 180° C.

The pigment thus prepared is likewise in the beta-phase and also has the greenish-yellow hue, but is substantially more transparent and more intensive than the pigment prepared as per example 1.

What is claimed is:

1. A process for coloring a composition comprising the steps of:
    conditioning an organic pigment, wherein said conditioning step includes thermally treating a liquid prepigment suspension in a microreactor to form a conditioned organic pigment; and
    adding said conditioned organic pigment to the composition.

2. The process of claim 1, wherein the composition is selected from the group consisting of an electrophotographic toner or developer, a powder coating, an aqueous or nonaqueous basis of an inkjet ink and a color filter.

* * * * *